US009818197B2

(12) United States Patent
Viti et al.

(10) Patent No.: US 9,818,197 B2
(45) Date of Patent: Nov. 14, 2017

(54) SYSTEM AND METHOD FOR READING MACHINE READABLE CODES IN TRANSPORTATION AND LOGISTIC APPLICATIONS

(71) Applicant: DATALOGIC IP TECH S.R.L., Bologna (IT)

(72) Inventors: Marco Viti, Bologna (IT); Emanuele Montemurro, Bologna (IT); Vittorio Rago, Bologna (IT)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

(21) Appl. No.: 14/726,084

(22) Filed: May 29, 2015

(65) Prior Publication Data

US 2016/0350928 A1  Dec. 1, 2016

(51) Int. Cl.

| G06K 9/00 | (2006.01) |
|---|---|
| G06T 7/00 | (2017.01) |
| G06K 7/14 | (2006.01) |
| G06K 9/32 | (2006.01) |
| G06F 17/30 | (2006.01) |
| G06K 19/06 | (2006.01) |
| G06K 7/10 | (2006.01) |

(52) U.S. Cl.
CPC ...... *G06T 7/0044* (2013.01); *G06F 17/30259* (2013.01); *G06K 7/10861* (2013.01); *G06K 7/1443* (2013.01); *G06K 9/3233* (2013.01); *G06K 19/06028* (2013.01); *G06T 2207/20021* (2013.01); *G06T 2207/20221* (2013.01)

(58) Field of Classification Search
CPC ............. G06T 7/0044; G06T 17/30259; G06T 7/0081; G06T 7/0097; G06T 2207/20221; G06T 2207/20021; G06K 9/3233; G06K 19/06028
See application file for complete search history.

(56) References Cited

U.S. PATENT DOCUMENTS 5,487,115 A * 1/1996 Surka ................... G06K 7/1452
  235/462.09
5,698,833 A * 12/1997 Skinger ................ G06K 7/1093
  235/462.09

(Continued)

FOREIGN PATENT DOCUMENTS

DE  2012024878 A1  6/2014

*Primary Examiner* — Tom Y Lu
(74) *Attorney, Agent, or Firm* — Dentons US LLP

(57) ABSTRACT

A system and computer-implemented method for searching for regions of interest may include performing a first linear image slice of an object including a machine-readable code associated therewith. Interesting blocks within the first linear image slice may be identified. A determination as to whether at least one isolated interesting block or multiple interesting blocks that are adjacent to one another exist within the first linear image slice may be made, and, if so, at least one blob inclusive of the at least one isolated interesting block or multiple interesting blocks being adjacent to one another may be identified, otherwise, the first linear image slice may be discarded. Respective geometrically shaped area(s) that include respective blob(s) may be formed, where the geometrically shaped area(s) define at least one region of interest is which the machine-readable code is located.

25 Claims, 11 Drawing Sheets

(56) References Cited

U.S. PATENT DOCUMENTS

| | | |
|---|---|---|
| 6,377,698 B1 | 4/2002 | Cumoli et al. |
| 2002/0117545 A1* | 8/2002 | Tsikos ............... B82Y 15/00 235/454 |
| 2004/0252875 A1* | 12/2004 | Crandall ............ G02B 21/002 382/133 |
| 2012/0127309 A1 | 5/2012 | Lee |
| 2012/0223141 A1* | 9/2012 | Good ............... G06K 7/10722 235/455 |

* cited by examiner

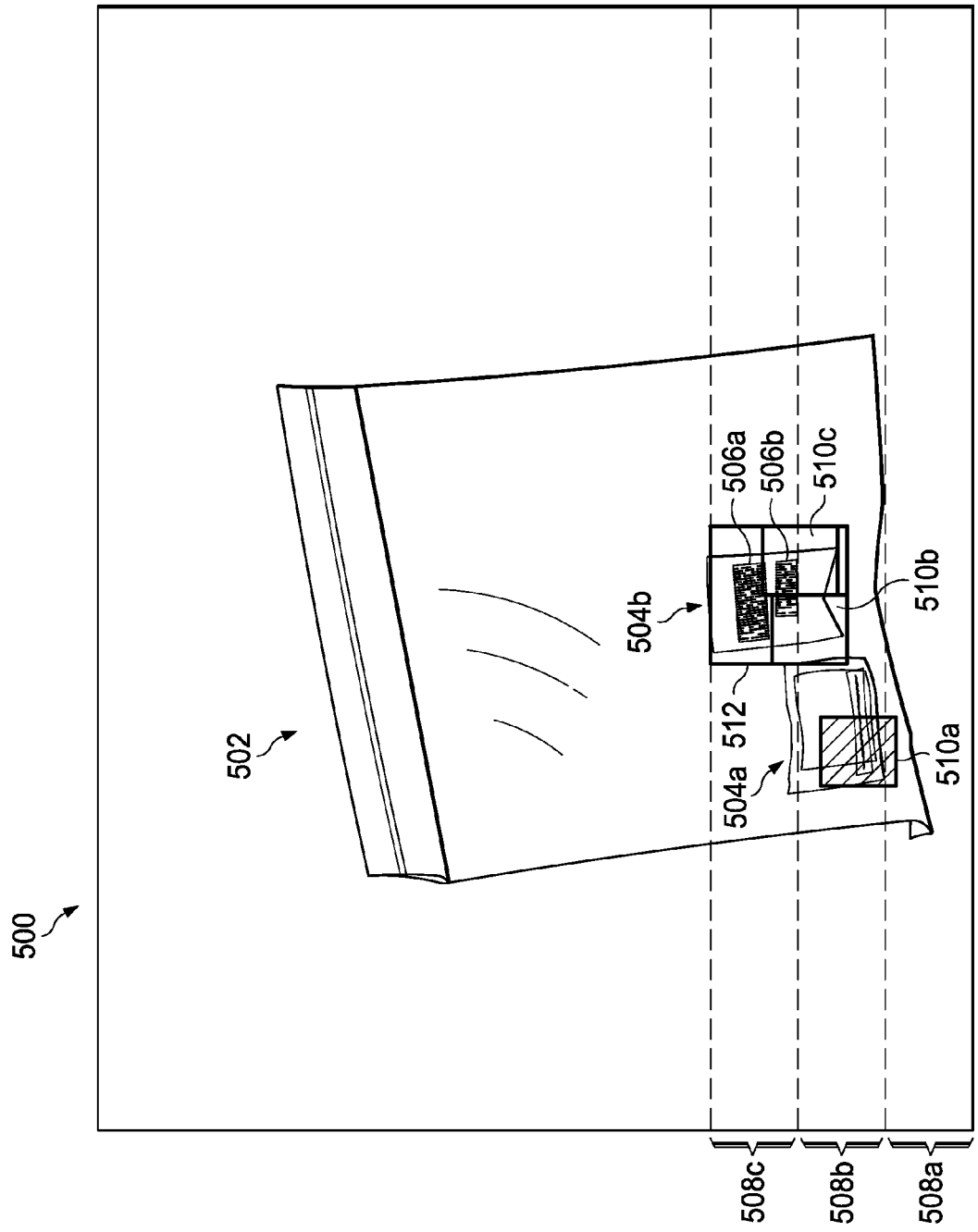

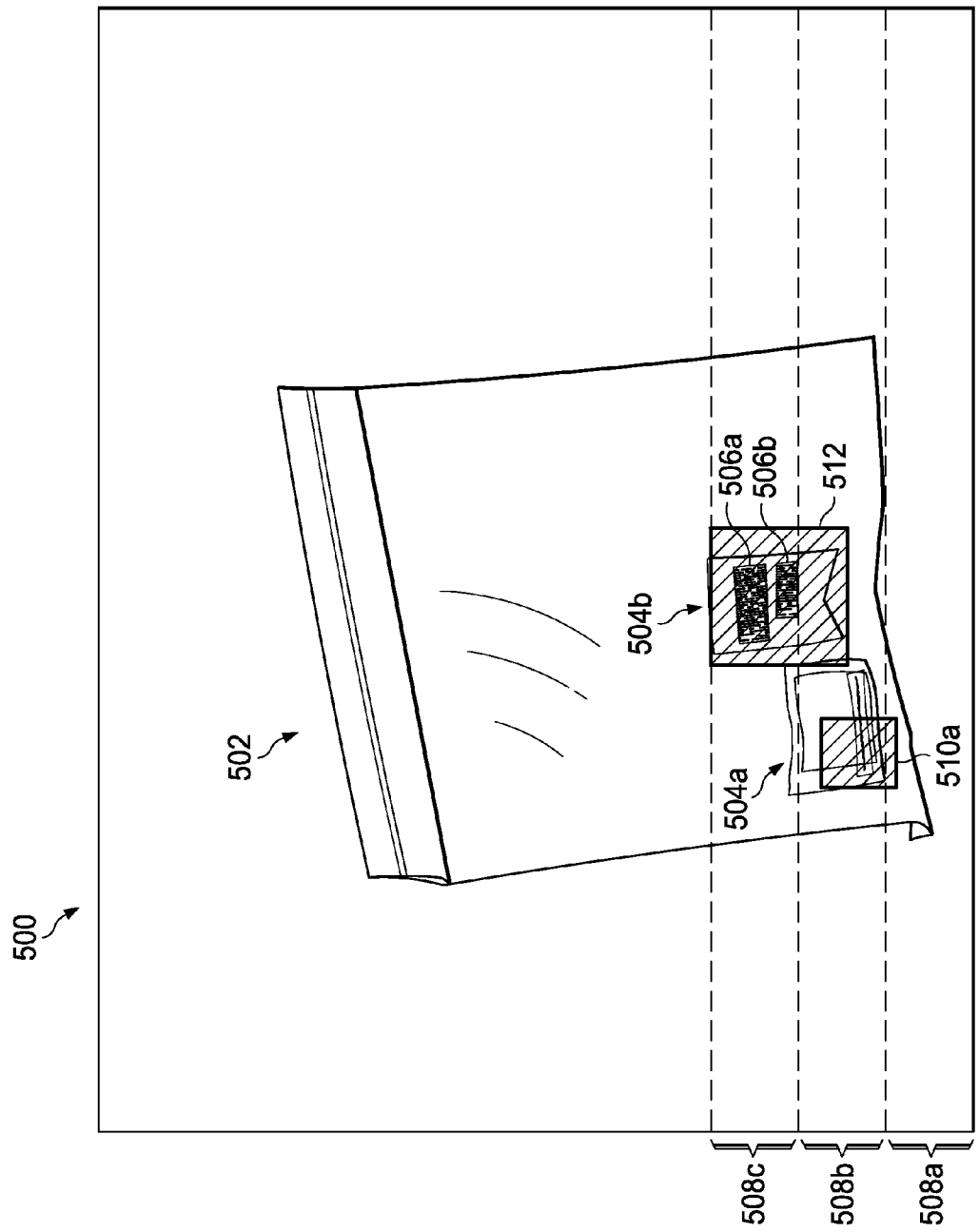

SYSTEM AND METHOD FOR READING MACHINE READABLE CODES IN TRANSPORTATION AND LOGISTIC APPLICATIONS

BACKGROUND

In transportation in logistic operations, machine-readable codes, hereinafter "codes," generally in the form of barcodes, are widely used to provide for counting and tracking of inventory. The codes are applied to objects, such as tires and packages, and are often transported on conveyor belts. Although typically in the form of machine-readable codes, the codes may also be in the form of symbols, alphanumeric indicia, or other form, as further described herein, that may be image processed and identified by a machine, and, thus, considered to be machine-readable codes or codes. Because it is typically unknown exactly where the codes will appear on the objects as the objects are transported on a conveyor belt or other forms of transport, an imaging device is positioned at a long-range distance (e.g., 1 m-2.5 m). The camera is used to read the codes positioned on the objects, and a linear image may be captured by linearly scanning an object as the object passes in front of the camera or the camera is moved past an object. However, because the code is physically small as compared to the objects, automatically identifying the location of the codes in the images of the objects is time-consuming, as understood in the art. In particular, the ability to find the code in a transportation and logistics process has been determined to be the primary limitation of throughput of such an image processing system.

In transportation and logistics applications, image acquisition of an object is performed by a linear sensor. The linear image scan is completed when the object finishes passing by the camera. Because a decoding process for reading the code(s) is a main driver of system delay, waiting for the entire image to be generated results in system throughput limitations.

SUMMARY

To improve speed in locating a machine readable code or code on objects processed in transportation and logistics applications, a progressive mode for processing images during a linear image scan may be used. In one embodiment, linear image slices may be made as a linear image scan of an object is being captured, and the linear image slices may be processed as the data is available in a real-time or substantially real-time basis. In determining that no interesting blocks within a linear image slice exist, the slice may be immediately discarded, thereby improving processing efficiency. Isolated interesting blocks or interesting blocks adjacent to one another in a cluster and called clusters or blobs, and blobs may be included within a geometrical shape, such as a rectangle, that defines a region of interest (ROI).

Region(s) of interest fully contained within a linear image slice are processed (e.g., scored), while regions of interest that extend to a border between linear image slices are frozen to determine if additional interesting block(s) that extend into the next slice exist. If additional interesting block(s) in the next slice exist that extend from a region of interest, the region of interest is extended into the next slice. As each slice is completed, region(s) of interest that are fully formed may be processed. In one embodiment, while scanning the object, the region(s) of interest determined to have the highest scores (e.g., top 15 scores) may be analyzed for a machine-readable code. The higher the score of a block, the higher the probability of the block including a machine-readable code, and, therefore, the higher the score of a region of interest inclusive of blocks with high scores, the higher the probability that the region of interest includes a code. The machine readable code(s) contained within one or more regions of interest may be read in processing the object.

One embodiment of a computer-implemented method for searching for regions of interest may include performing a first linear image slice of an object including a machine-readable code associated therewith. Interesting blocks within the first linear image slice may be identified. A determination as to whether at least one isolated interesting block or multiple interesting blocks that are adjacent to one another exist within the first linear image slice may be made, and, if so, at least one blob inclusive of the at least one isolated interesting block or multiple interesting blocks being adjacent to one another may be identified, otherwise, the first linear image slice may be discarded. Respective geometrically shaped area(s) that include respective blob(s) may be formed, where the geometrically shaped area(s) define at least one region of interest is which the machine-readable code is located.

One embodiment of a system for searching for regions of interest may include a linear imaging device configured to linearly image an object within a scene. A processing unit may be in communication with the linear imaging device, and be configured to perform a first linear image slice of an object including a machine-readable code associated therewith. The processing unit may further be configured to identify interesting blocks within the first linear image slice. A determination may be made as to whether at least one isolated interesting block or multiple interesting blocks that are adjacent to one another exist within the first linear image slice, and, if so, the processing unit may be configured to identify at least one blob inclusive of the at least one isolated interesting block or multiple interesting blocks being adjacent to one another, otherwise, discard the first linear image slice. Respective geometrically shaped area(s) that includes respective at least one blob may be formed, where the geometrically shaped area(s) define region(s) of interest in which the machine-readable code is located.

Another embodiment of a computer-implemented method for searching for a machine readable code on an object in a transportation and logistics environment may include linearly scanning the object being automatically moved relative to a linear sensor configured to perform successive linear image slicing to capture an entire image of the object including a code positioned on or in association with the object. Potential locations of the code in each image slice may be cluster-built as soon as image data in each image slice is available to be analyzed.

BRIEF DESCRIPTION OF THE DRAWINGS

Illustrative embodiments of the present invention are described in detail below with reference to the attached drawing figures, which are incorporated by reference herein and wherein:

FIGS. 5A-5E are illustrations of an example that shows a series of linear image slices formed when imaging an object and processed when searching for a code positioned on the object.

DETAILED DESCRIPTION OF THE DRAWINGS

Figure 1:
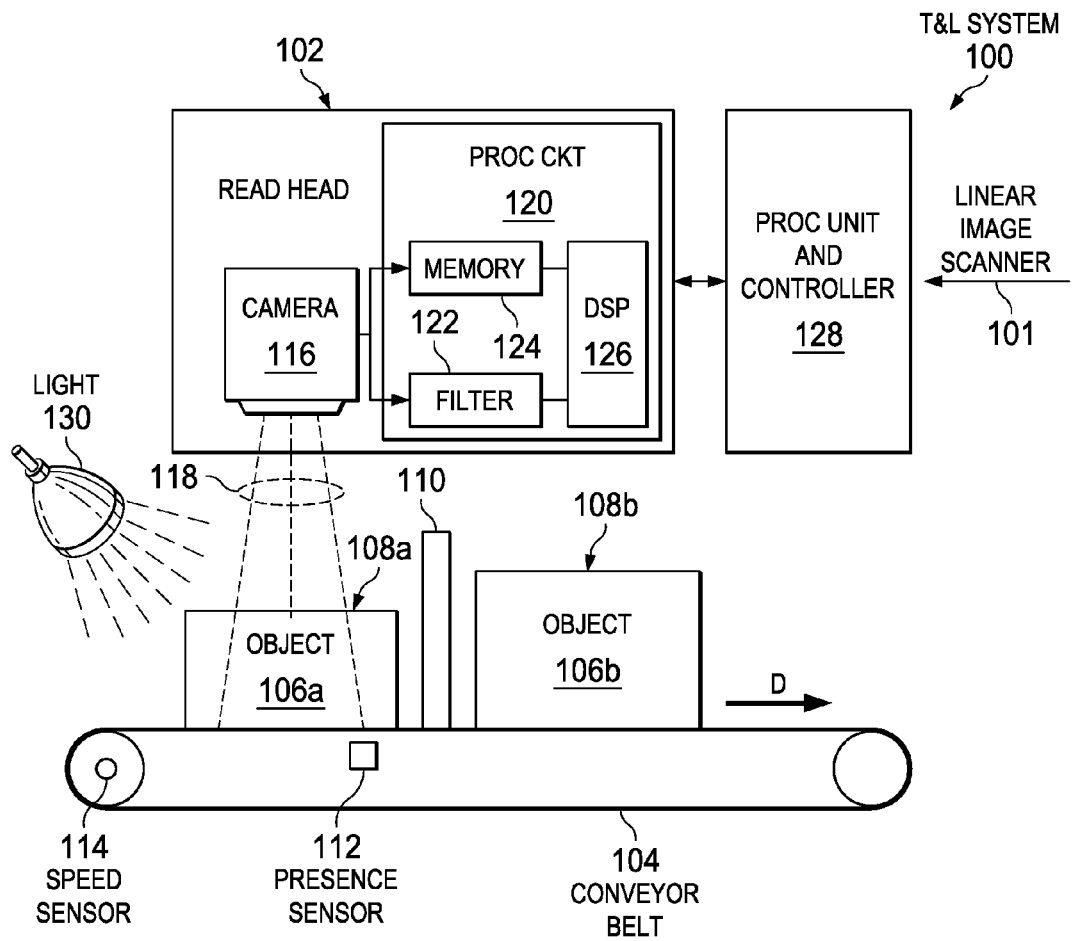
FIG. 1 is an illustration of an illustrative transportation and logistics system in which objects, such as tires or packages, are scanned using a linear image scanner to read machines readable codes (e.g., barcodes)

With regard to FIG. 1, an illustration of an illustrative transportation and logistics system 100 in which objects, such as tires or packages, are scanned using a linear image scanner 101 to read machine-readable codes (e.g., barcodes, symbols) is shown. The linear image scanner 101 is shown to include a read head 102 facing a conveyor belt 104 or other transport system to scan objects 106a and 106b (collectively 106) laying on the conveyor belt 104 and traveling in a straight horizontal direction D. Each of the objects 106 include, on their respective face 108a and 108b (collectively 108), a scanning region (not shown) including a number of relevant regions (see, for example, FIG. 2 of U.S. Pat. No. 6,377,698) inclusive of a code. In an alternative embodiment, rather than the relevant regions being on the faces 108 of the objects 106, codes may be positioned in association to the objects 106. For example, a code may be positioned on a carrier (not shown) on which the objects 106 are positioned while being transported on the conveyor belt 104.

As part of the transportation and logistics system 100, a height sensor 110, presence sensor 112, and speed sensor 114 may be utilized by the linear image scanner 101 to respectively determine height of the objects 106 traveling along the conveyer belt 104, presence of the objects 106, and speed of the conveyer belt 104 and objects 106 being transported thereon with respect to the read head 102. In one embodiment, rather than transporting the objects 106 on a transport system, the read head 102 may be moved relative to the objects 106. Still yet, the objects 106 and read head 102 may be moved simultaneously with respect to one another.

The read head 102 may include a camera 116, such as a CCD linear sensor camera configured to perform linear image scanning in the form of linear imaging lines 118, as understood in the art. In one embodiment, the camera is a long range camera with variable size (e.g., 7 Mpixels to 62 Mpixels). Different lighting conditions and backgrounds may be utilized to improve imaging by creating more contrast between a code and background. A processing circuit 120 may include a filter 122 configured to filter certain wavelengths or other image parameters and memory 124 configured to store image data and/or software. The filter 122 may be a low-pass filter, bandpass filter, or any other filter to improve imaging, as understood in the art. A digital signal processor (DSP) 126 may be used to process image data captured by the camera 116, filtered by the filter 122, and stored in memory 124, for example. A processing unit and controller 128 may be in communication with the read head 102, sensors 110, 112, and 114, and, optionally, light 130, and drive system (not shown) of the conveyer belt 104 to control the speed at which the conveyer belt 104 is operating to synchronize the operation of the camera 116 in capturing linear image scans of the objects 106. The light 130 may be any illumination device (e.g., LED) utilized to illuminate the faces 108 of the objects 106 to improve reading ability by the read head 102. In one embodiment, the light 130 may be a continuous light or a strobe light to cause an illumination flash when the camera 116 is imaging the faces 108 of the objects 106.

The scanning region may include a generally flat surface defining a background that is typically a uniform color and a number of relevant regions distinguishable from the background by structure and color containing information or a structure for inclusion of information. For example, the relevant regions may include portions delimited by graphic signs, such as tables, matrices, labels, and/or geometrically defined structures; automatically impressed alphanumeric signs that are printed or manually impressed; photographs; optical codes defined by a number of graphic signs with information coded in the form of a sequence of black and white or variously colored regions extending in one or more directions (e.g., barcodes, quick-reference (QR) codes); color codes, or any other machine-readable code. For the purpose of this specification, machine-readable code may be any form of information that can be imaged and processed using a scanner an signal processor, including, but not limited to, barcode scanner, QR scanner, optical character recognition (OCR) scanner, or otherwise.

Figure 2:
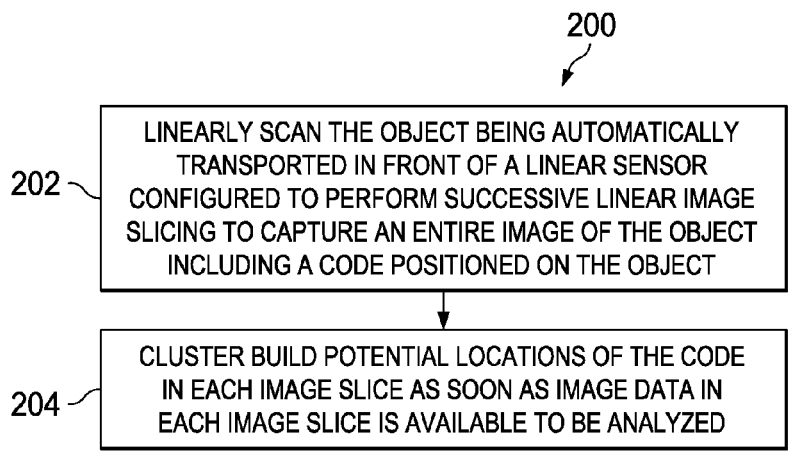
FIG. 2 is a flow diagram of an illustrative process for searching for a code positioned on an object in a transportation and logistics environment.

With regard to FIG. 2, a flow diagram of an illustrative process 200 for searching for a code positioned on an object in a transportation and logistics environment is shown. The process 200 may start at step 202, where the object may be scanned by successive linear image slicing to capture an image of the object including a code positioned in association with the object (e.g., affixed to or otherwise positioned in camera view of the object). In one embodiment, the object may be automatically transported in front of a linear image sensor. For example, the object may be transported on a conveyor belt or other transport mechanism that automatically moves the object in front of a linear image sensor, such as a CCD linear image sensor. At step 204, potential locations of the code in each image slice may be cluster-built (i.e., clustered) or grouped as soon as image data in each image slice is available to be analyzed. In one embodiment, the image data may be available to be analyzed after completion of an entire linear image slice. Alternatively, the image data may be processed prior to completion of an image slice in a real-time or substantially real-time manner, where substantially real-time may be delayed or limited due to processing speed of hardware, for example.

With regard to FIG. 3, a flow diagram of a more detailed illustrative process 300 for searching for a code positioned in association with an object in a transportation and logistics environment is shown. The process 300 may start at step 302, where a linear image slice of the object may be performed. In performing the first linear image slice, an entire image may be captured by scanning using a linear imaging sensor and dividing the entire image into multiple slices having a certain length and width based on a number of pixels, for example. That is, in scanning the object, a linear image slice may be defined after a certain linear distance is scanned or number of pixels are generated. Alternatively, an entire image may be captured and sub-images (e.g., slices) may be defined. The code may be affixed to the object or be associated therewith (e.g., positioned on the carrier which the object is being transported). At step 304, interesting blocks within the linear image slice may be identified. In identifying the interesting blocks, an algorithm, such as one described in U.S. Pat. No. 6,377,698, may be utilized. In one embodiment, selective image compression may be utilized in capturing and processing an image of an object, as further described in concurrently filed US patent application entitled, "Region of Interest Location and Selective Image Compression," having 14/725,544, which is hereby incorporated by reference in its entirety.

In one illustrative embodiment, in identifying interesting blocks within the linear image slice at step 304, each image may be divided into a number of elementary windows, where each window includes a predetermined number of pixels (e.g., N pixels). A brightness gradient may be calculated for each window. A brightness gradient may be considered significant if the value is above a predetermined threshold value. A transformation may then be applied to each gradient passing from gradient space (i.e., defined by amplitude, direction, and side) to direction space (i.e., only defined by amplitude and direction). The quantized gradients may be grouped into a number of subsets called tiles or blocks, which are obtained by dividing the acquired image into a number of sub-images (tiles). That is, each acquired image includes a number of windows. Each block may be given a score obtained by a vectorial sum of the quantize gradients of the windows within the block representing the probability that the block contains a linear barcode. Applying a threshold to the scores of the blocks makes it possible to discriminate between interesting and non-interesting blocks using morphological features rather than contrast features. It should be understood that alternative signal processing algorithms may be utilized for identifying interesting blocks.

At step 306, a determination as to whether at least one interesting block within the linear image slice exists may be made. If a determination that at least one interesting block exists, then at step 308, a blob (i) for each isolated interesting block or (ii) for each group of multiple interesting blocks being adjacent to one another may be identified and/or created. As an example, multiple blobs may be created by identifying isolated interesting blocks or groups of adjacent interesting blocks. The blobs may contain the same or different numbers of interesting blocks.

In processing the blobs, a predetermined number of blobs, such as 15, with the highest values may be utilized as it may be assumed that a code is contained within the highest scored blobs. The values of blobs may be a sum of values of interesting blocks within the blobs. It should be understood that a higher or lower predetermined of blobs may be utilized, and that the fewer the number of blobs, the faster the process of analyzing the blobs, but the higher risk of missing a blob with a code.

If it is determined at step 306 that no interesting blocks are identified within the linear image slice, then at step 310, the linear image slice may be discarded, thereby reducing the amount of processing time needed to process the image of the object when searching for the code.

At step 312, after identifying the blob(s), respective at least one geometrically shaped area that includes the blob(s) may be formed. The geometrically shaped area(s) are used to define at least one region of interest in which to locate the code. The geometrically shaped area(s) may be rectangular or any other geometric shape that encompasses a blob and is considered a region of interest (ROI). In one embodiment, the ROI is rectangular for efficient processing purposes. Other geometrical shapes may be utilized, as well, including any geometric shape of a region of interest that increases processing depending on an image processing algorithm used. As described further hereinbelow, a region of interest may extend across multiple linear image scans, so the region(s) of interest may not be processed until a determination that the region of interest is complete because the entire ROI cannot be analyzed until at least the next linear image slice is processed. Processing of the region(s) of interest may thereafter be performed by a reading process of a machine-readable code. If the linear image slice is the first or last image slice, then it is assumed that the ROIs do not start prior to the first image slice or end after the last image slice, thereby expediting processing of the first and last slices. After step 312, the process 300a may continue to FIG. 3B.

Figure 3A:
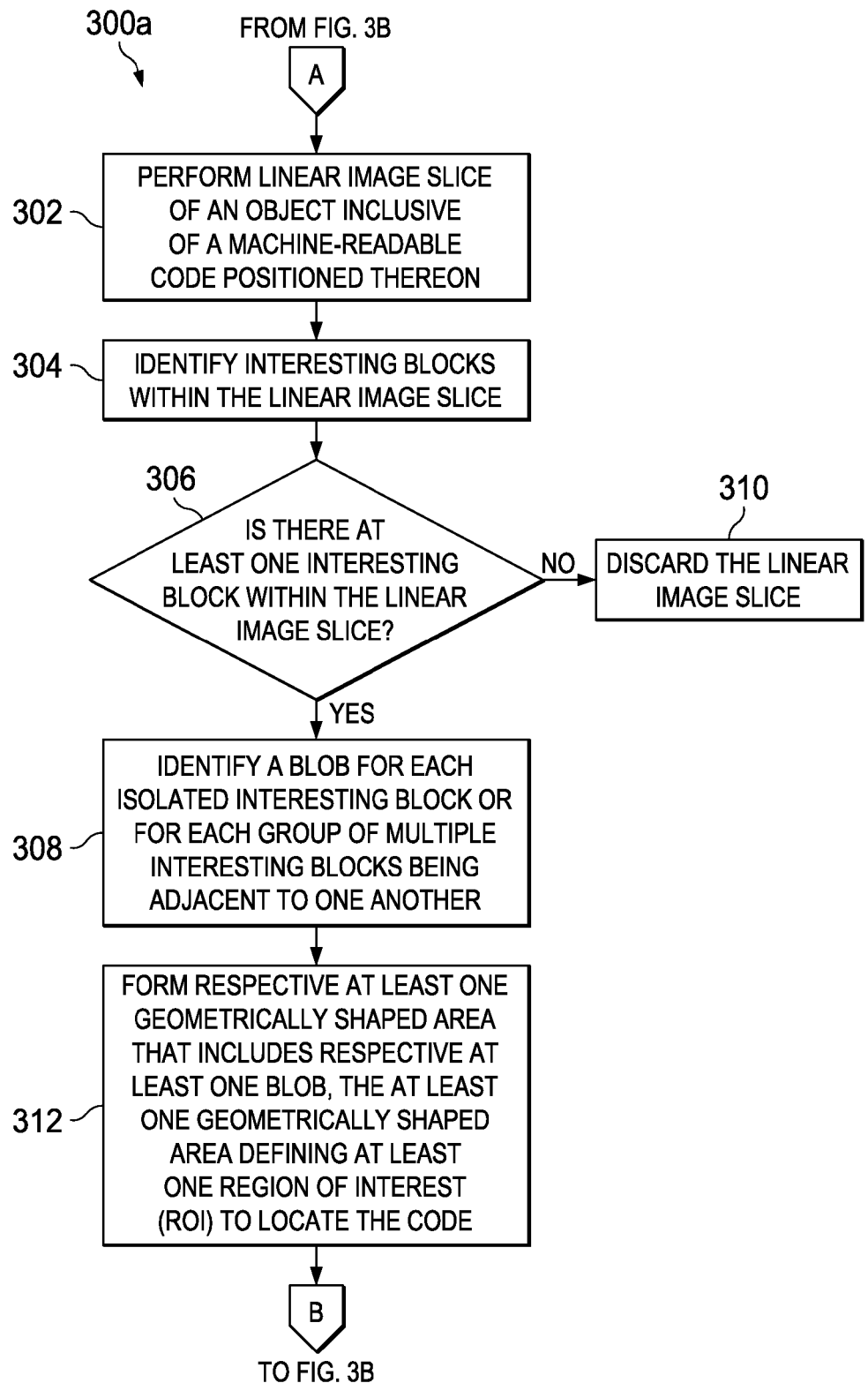
FIGS. 3A and 3B (collectively FIG. 3) are flow diagrams of a more detailed illustrative process for searching for a code positioned on an object in a transportation and logistics environment.
Figure 3B:
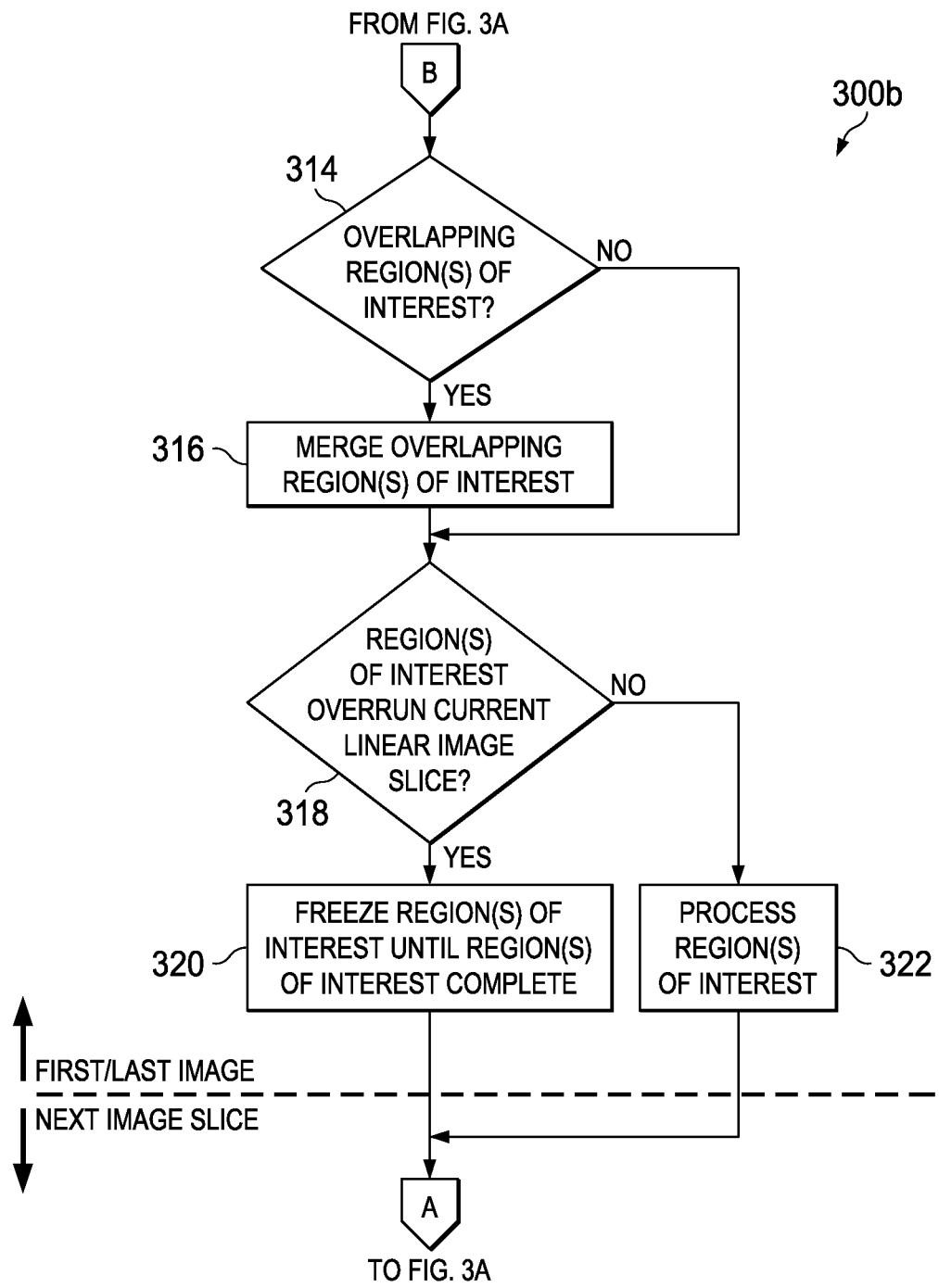

With regard to FIG. 3B, a flow diagram of an illustrative process 300b for processing ROIs identified in FIG. 3A is shown. The process 300b may start at step 314, where a determination as to whether overlapping ROIs exist. If a determination is made at step 314 that overlapping ROIs do exist, then the process 300b continues at step 316, where the ROIs are merged into a single ROI. In merging the ROIs, an ROI may be formed that includes each of the overlapping ROIs. In one embodiment, merging multiple ROIs is performed if the resulting ROI is less than or equal to the sum of the areas of the individual ROIs such that the merging leads to a reduction of total processing time of the ROIs. If a determination is made at step 314 that there are no overlapping ROIs, then no ROIs are merged.

At step 318, a determination as to whether any ROIs overrun a current linear image slice into a next slice by determining whether any of the ROIs have a common border with the current slice and a next slice. If a determination is made at step 318 that one or more ROIs overrun the current slice, then the process continues at step 320, where the ROI(s) that overrun the current slice may be "frozen." In being frozen, the ROI(s) are not processed until it is determine that the ROI(s) are complete with any additional portion of the ROI(s) that extend into the next slice. If it is determined at step 318 that the ROI(s) are complete (i.e., not overlapping into the next slice), then the ROI(s) may be processed at step 322. In processing the ROI(s) at step 322, a determination may be made as to whether the ROI(s) include a code and/or a code within the ROI(s) may be read (e.g., localized and decoded), as understood in the art. The process 300b returns back to step 302 in FIG. 3A for processing a next linear image slice.

In processing each of the next linear image slices until the second to the last linear image slice, for each frozen ROI of the previous slice, a determination at step 314 may be made as to whether there is an overlap with any of the ROIs found in the current image slice, and if so, the overlapping ROIs may be merged at step 314 (FIG. 3B). As part of the next slice processing at step 314, any of the ROIs that are determined to be adjacent to or extending from the frozen ROI(s) may also be merged at step 316.

In processing the last linear image slice, rather than performing steps 318 and 320, only step 322 is performed, where the ROIs are processed since no further linear image slices of the linear image are performed. That is, there is no need to determine if any of the ROIs overrun the last linear image slice and no ROIs are to be frozen, which increases the speed of processing the linear image scan.

Figure 4A:
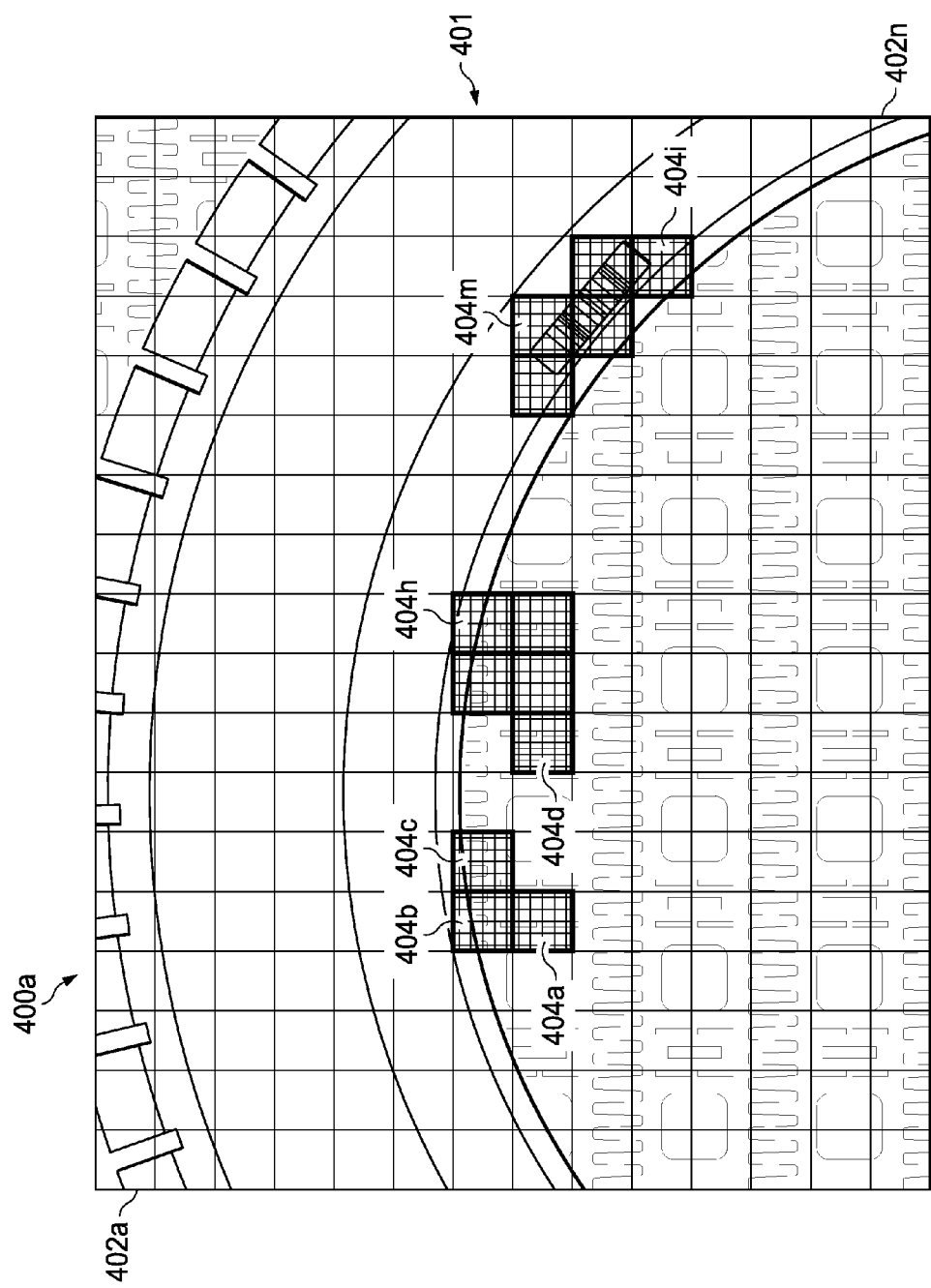
FIG. 4A is an illustration of an illustrative image of an object, in this case a tire, divided into blocks or tiles with interesting blocks being highlighted.

With regard to FIG. 4A, an illustration of an illustrative image 400 of an object 401, in this case a tire, is divided into blocks or tiles 402a-402n (collectively 402) with interesting blocks 404a-404i (collectively 404) being highlighted is shown. The blocks 402 not indicated as interesting blocks 404 are considered not to be interesting in terms of potentially including a code or portion thereof. The image 400 may be a linear image slice of the object 401, and the blocks 402 may be a predetermined size based on a variety of factors, such as number of pixels within a block, resolution of the camera, size of the image 400, and so on. As previously described with regard to step 304 (FIG. 3A), the interesting blocks 404 are identified by using a brightness gradient algorithm to identify blocks 402 that have a rating at or above a threshold value. Alternative processes or algorithms, as understood in the art, may be used for determining interesting blocks.

Figure 4B:
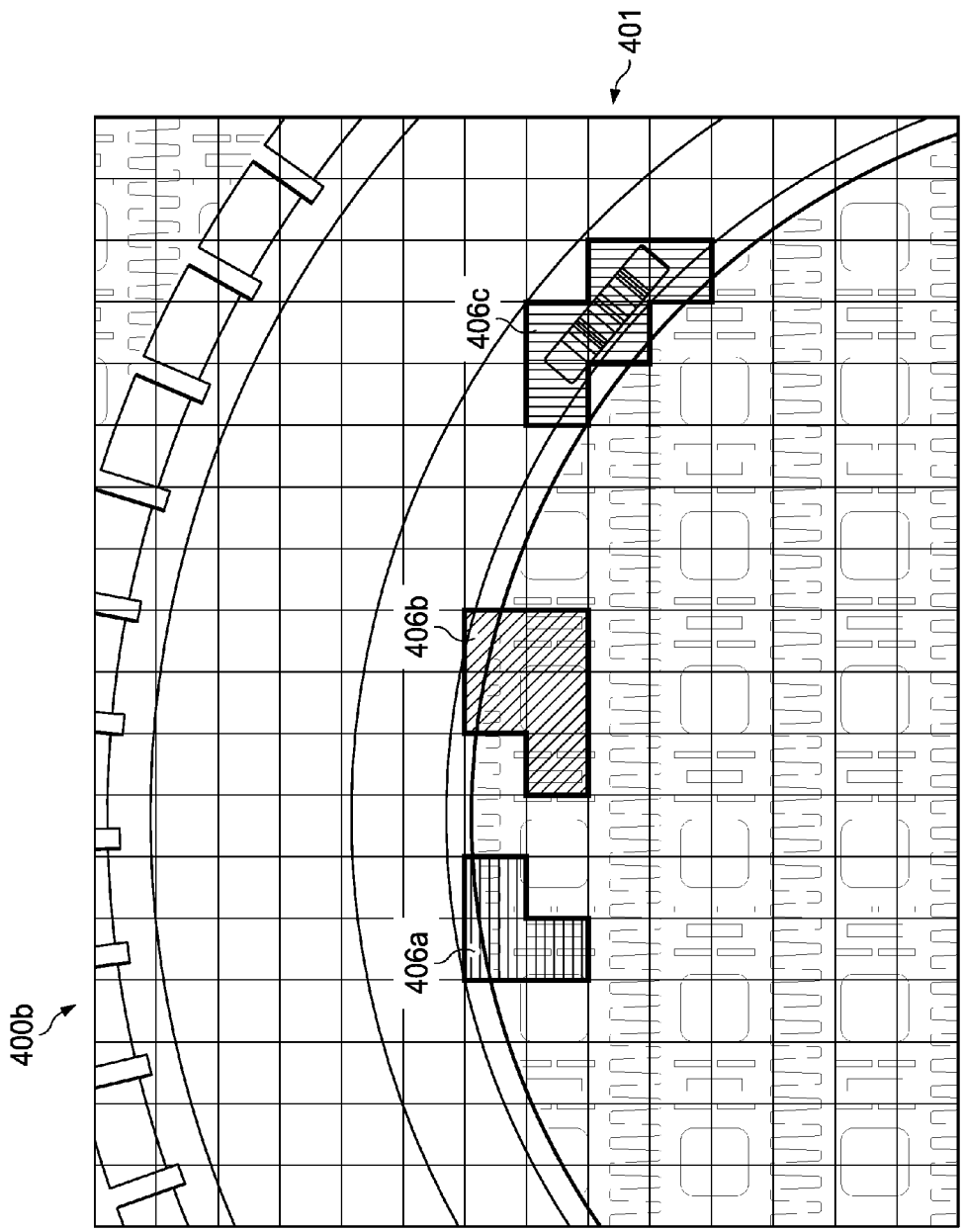
FIG. 4B is an illustration of an illustrative image of the object of FIG. 4A including the interesting blocks that are adjacent to one another being clustered into clusters or blobs.

With regard to FIG. 4B, an illustration of an image 400b of the object 401 of FIG. 4A including the interesting blocks 404 that are adjacent to one another being clustered into clusters or blobs 406a-406c (collectively 406) is shown. The clusters or blobs 406 operate to aggregate the sets of interesting blocks 404 that potentially include a code. In this example, three clusters 406 are shown. However, it should be understood that more or fewer numbers of clusters may be formed based on the number of interesting blocks found to be adjacent to one another that are identified. It should also be understood that isolated interesting blocks that are identified may also be treated as a cluster for establishing that the isolated blocks are regions of interest.

Figure 4C:
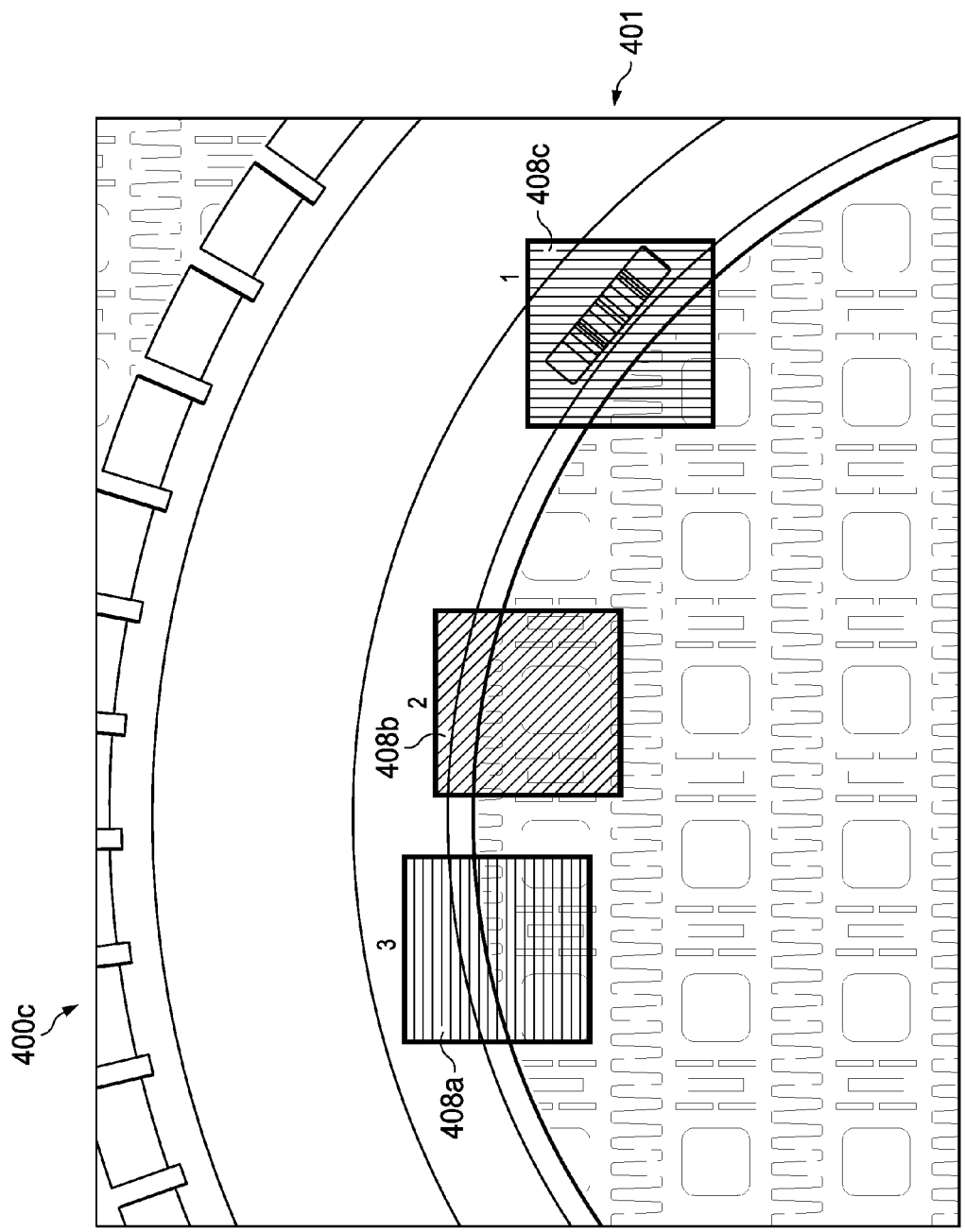
FIG. 4C is an illustration of an image inclusive of illustrative regions of interest being formed as geometrically shaped areas (e.g., rectangles) that include the respective clusters or blobs of FIG. 4B.

With regard to FIG. 4C, an illustration of an image 400c inclusive of illustrative regions of interest 408a-408c (collectively 408) being formed as geometrically shaped areas (e.g., rectangles) that include respective clusters or blobs 406 of FIG. 4B is shown. In this example, three regions of interest 408 are shown, where the respective regions of interest 408a-408c are formed to include the respective blobs 406a-406c. Further in this example, none of the regions of interest 408 overlap one another, so the regions of interest 408 are not merged. If any of the regions of interest 408 overlapped one another, then those overlapping regions of interest 408 would be merged, as described with regard to step 316 of FIG. 3.

As previously described with regard to step 306 of FIG. 3A, a predetermined number of blobs may be set to be formed into ROIs to reduce the amount of search time to identify location of a code. For example, in an embodiment, a predetermined number K=15 may be set such that only the 15 clusters or blobs (inclusive of isolated interesting blocks or multiple, adjacent interesting blocks) with the highest scores (e.g., total sum, average, etc.) may be considered in determining location of the code(s). It should be understood that alternative predetermined numbers of blobs may be utilized. Still yet, rather than being predetermined, the number may be dynamically set based on a variety of factors, such as how many times under existing conditions it takes for the system to properly identify location of a code, failure rates, amount of time desired to perform the search process, and so forth.

With regard to FIGS. 5A-5E, illustrations of an illustrative scene 500 inclusive of an object 502, in this case a package, that includes one or more labels or stickers 504a and 504b (collectively 504) with machine-readable codes 506a and 506b (collectively 506) affixed on the object 502 are shown. The process of FIG. 3 may be used to capture one or more linear image scans of the object, and one or more linear image slices 508a-508e (collectively 508) may be performed. In performing the linear image slices 508, the slices 508 may be portions of a linear image scan of the object, and be considered sub-images of a larger image of the entire object. Although performing linear image scanning may be used on one embodiment, other imaging techniques, such as capturing a full image of an object and sub-images (e.g., image slices) may be processed therefrom if such image processing can be performed in a timely manner.

Figure 5A:
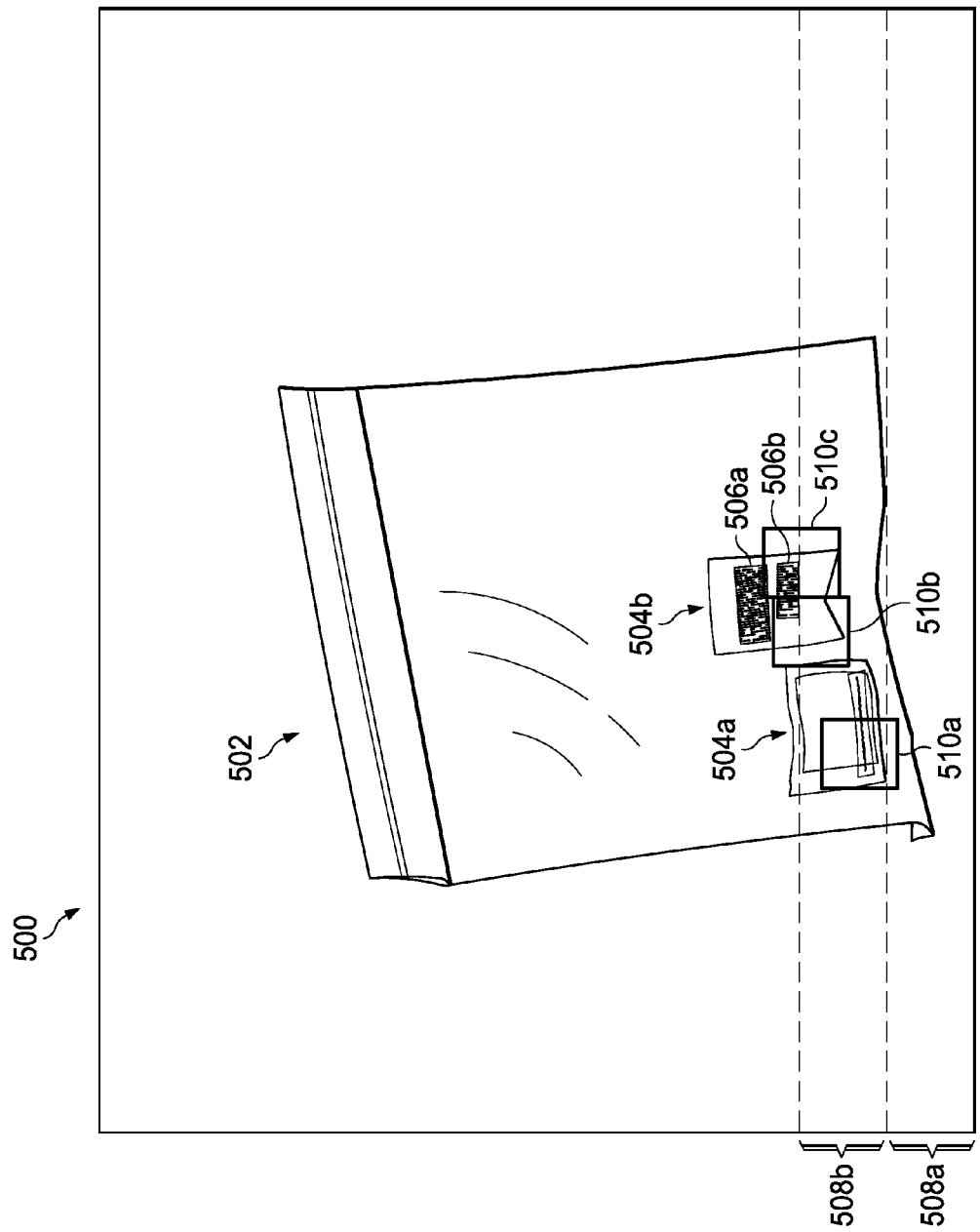
Figure 5B:
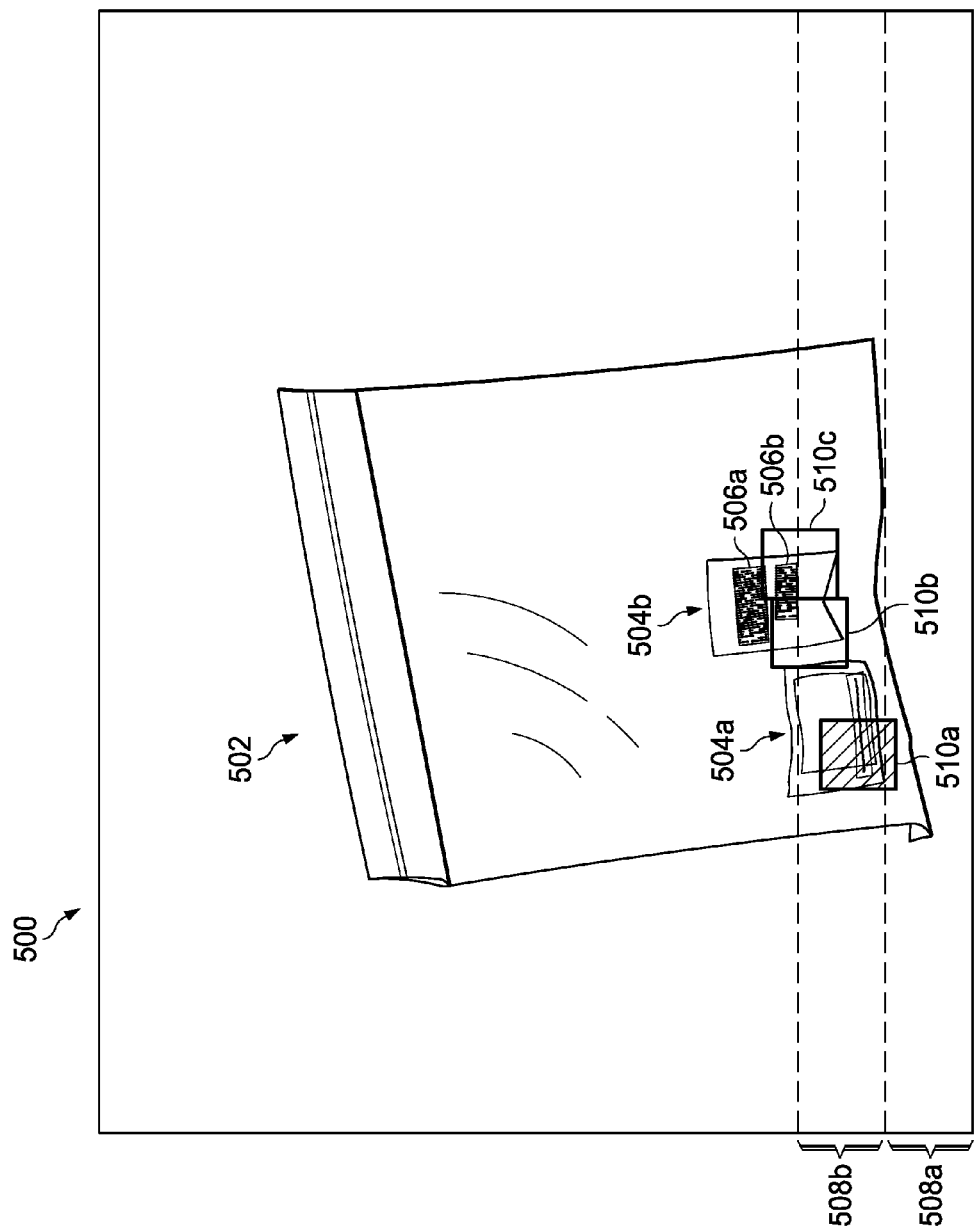
Figure 5E:
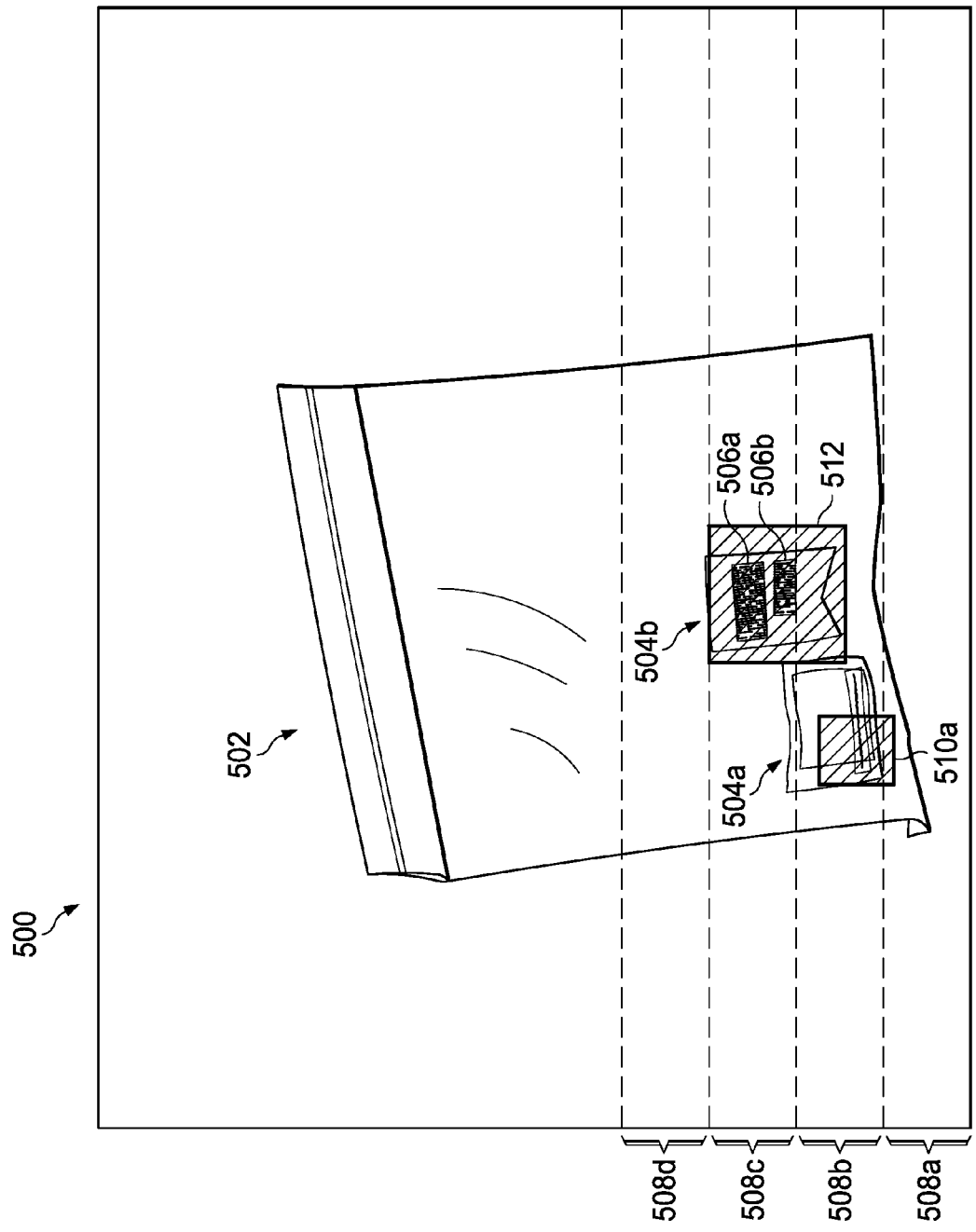

If the first linear image slice 508a is determined to have no interesting blocks, then the first linear image slice 508a may be immediately discarded. The second linear image slice 508b may be determined to have three different clusters or blobs (not specifically identified) that are used to form three corresponding regions of interest 510a, 510b, and 510c (collectively 510). ROI 510a is limited to be fully contained in linear image slices 510a and 510b (or potentially only linear image slice 510b), so can be processed when available, such as shown in FIG. 5B and prior to processing linear image slice 508c. The other two ROIs 510b and 510c, if determined to be overlapping, may be formed into a single ROI. As shown, both of the ROIs 510b and 510c extend to the border of linear image slices 508b and 508c, so are frozen prior to processing the third linear image slice 508c.

In processing the third linear image slice 508c in FIG. 5C, in accordance with the process of FIG. 3, new interesting blocks are identified, formed into blobs, and combined or merged with the corresponding ROIs 510b and 510c to extend the ROIs 510b and 510c into the third linear image slice 508c. ROI 512 may be formed to include the ROIs 510b and 510c. Because the ROI 512 is determined to be fully included in the slices 508b and 508c, the ROI 512 may be processed as shown in FIG. 5D, and prior to performing a forth linear image slice 508d shown in FIG. 5E. The forth linear image slice 508d does not include any interesting blocks, and is therefore discarded without processing any ROIs. Although not shown, additional linear image slices may be performed until the entire object 502 is processed. It should be understood that the processing of the image 500 may be ceased upon reading the code(s) 506 on the object 502, if a number of code(s) 506 are known before processing the object 502.

Utilizing the system and processes described herein, reduction of image processing time has been shown to provide about 18% or more, and reduction of the variance of processing reduced about 22% or more.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A computer-implemented method for searching for regions of interest, said method comprising:
    performing a first linear image slice of an object including a machine-readable code associated therewith;
    identifying interesting blocks within the first linear image slice;
    determining whether at least one isolated interesting block or multiple interesting blocks that are adjacent to one another exist within the first linear image slice, and, if so,
        identifying at least one blob inclusive of the at least one isolated interesting block or multiple interesting blocks being adjacent to one another,
    otherwise, discarding the first linear image slice; and
    forming at least one geometrically shaped area that includes at least one blob, wherein the at least one geometrically shaped area defines at least one region of interest in which the machine-readable code is located.

2. The computer-implemented method according to claim 1, further comprising:
    determining whether any regions of interest overlap one another; and
    if a determination is made that at least two regions of interest overlap each other, merging at least two overlapping regions of interest to form a single region of interest by forming a geometrically shaped area around the at least two overlapping regions of interest;
    otherwise, not merging any of the at least two regions of interest.

3. The computer-implemented method according to claim 1, wherein forming the at least one geometrically shaped area includes forming a rectangular area.

4. The computed-implemented method according to claim 1, further comprising:
    determining whether any of the at least one region of interest does not share a border of the first linear image slice at which a second linear image slice is to be made; and
    if a determination is made that the at least one region of interest does not share the border, processing any of the at least one region of interest that does not share the border;
    otherwise, freezing any of the at least one region of interest that share the border at which the second linear image slice is to be made.

5. The computer-implemented method according to claim 4, further comprising:
    performing a second linear image slice of the object;
    identifying second interesting blocks within the second linear image slice;
    identifying at least one second blob inclusive of at least one isolated interesting block or multiple adjacent interesting blocks being adjacent to one another in the second linear image slice; and forming respective at least one second geometrically shaped area that include respective at least one second blob, the at least one second geometrically shaped area defining at least one second region of interest.

6. The computer-implemented method according to claim 4, further comprising:

determining whether any of the at least one second region of interest is adjacent to any of the at least one region of interest that was frozen; and if a determination is made that any of the at least one second region of interest is adjacent to any of the at least one region of interest that was frozen, merging the regions of interest that are determined to be adjacent to one another to form a geometrically shaped region of interest that spans across the border between the successive regions of interest.

7. The computer-implemented method according to claim 1, further comprising reading the code in the at least one region of interest.

8. The computer-implemented method according to claim 1, further comprising:

determining a score indicative of including a code for each of the respective blobs; and in forming respective at least one geometrically shaped area, forming up to a predetermined number of geometrically shaped areas inclusive of blobs with the highest scores.

9. A system for searching for regions of interest, said system comprising:

a linear imaging device configured to linearly image an object within a scene;

a processing unit in communication with said linear imaging device, and configured to:

perform a first linear image slice of an object including a machine-readable code associated therewith;

identify interesting blocks within the first linear image slice;

determine whether at least one isolated interesting block or multiple interesting blocks that are adjacent to one another exist within the first linear image slice, and, if so, identify at least one blob inclusive of the at least one isolated interesting block or the multiple interesting blocks being adjacent to one another, otherwise, discard the first linear image slice; and form at least one geometrically shaped area that includes at least one blob, the at least one geometrically shaped area defining at least one region of interest in which the machine-readable code is located.

10. The system according to claim 9, wherein said processing unit is further configured to:

determine whether any regions of interest overlap one another; and if a determination is made that at least two regions of interest overlap each other, merge at least two overlapping regions of interest to form a single region of interest by forming a geometrically shaped area around the at least two overlapping regions of interest;

otherwise, not merge any of the at least two regions of interest.

11. The system according to claim 9, wherein said processing unit, in forming the at least one geometrically shaped area, is configured to form a rectangular area.

12. The system accord to claim 9, wherein said processing unit is further configured to:

determine whether any of the at least one region of interest does not share a border of the first linear image slice at which a second linear image slice is to be made; and if a determination is made that the at least one region of interest does not share the border, process any of the at least one region of interest that does not share the border;

otherwise, freeze any of the at least one region that share the border at which the second linear image slice is to be made.

13. The system according to claim 12, wherein said processing unit is further configured to:

perform a second linear image slice of the object;

identify second interesting blocks within the second linear image slice;

identify at least one second blob inclusive of at least one isolated interesting block or multiple adjacent interesting blocks being adjacent to one another in the second linear image slice; and form respective at least one second geometrically shaped area that includes respective at least one second blob, the second at least one second geometrically shaped area defining at least one second region of interest.

14. The system according to claim 12, wherein said processing unit is further configured to:

determine whether any of the at least one second region of interest is adjacent to any of the at least one region of interest that were frozen; and if a determination is made that any of the at least one second region of interest is adjacent to any of the at least one region of interest that was frozen, merge the regions of interest that are determined to be adjacent to one another to form a geometrically shaped region of interest that spans across a border between the successive regions of interest.

15. The system according to claim 9, wherein said processing unit is further configured to read a code in the at least one region of interest.

16. The system according to claim 9, wherein said processing unit is further configured to:

determine a score for each of the respective blobs; and in forming respective at least one geometrically shaped area, form up to a predetermined number of geometrically shaped areas inclusive of blobs with the highest scores.

17. A computer-implemented method for searching for a machine readable code on an object in a transportation and logistics environment, said method comprising:

linearly scanning the object being automatically moved relative to a linear sensor configured to perform successive linear image slicing to capture an entire image of the object including a code positioned on or in association with the object; and cluster-building potential locations of the code in each image slice as soon as image data in each image slice is available to be analyzed, the cluster-building including:

identifying interesting blocks in each successive image slice that potentially include a portion of the code;

identifying at least one isolated interesting block or multiple interesting blocks that are adjacent to one another to form a cluster of interesting blocks in each successive image slice; and forming one or more geometrically shaped regions of interest that include respective clusters of interesting blocks.

18. The computer-implemented method according to claim 17, further comprising:
determining respective scores representative of potential for the interesting blocks that are included in the cluster of interesting blocks to include at least a portion of a code of each of the geometrically shaped regions of interest; and
wherein forming the one or more geometrically shaped regions of interest includes forming a predetermined number of geometrically shaped regions with the highest scores.

19. The computer-implemented method according to claim 17, wherein forming one or more geometrically shaped regions of interest include forming one or more rectangular region of interest.

20. The computer-implemented method according to claim 17, further comprising discarding any of the image slices that do not include any interesting blocks.

21. The computer-implemented method according to claim 17, further comprising:
determining whether any of the one or more geometrically shaped regions of interest are not touching a border between the successive linear image slices; and
if any of the one or more geometrically shaped regions of interest are not touching a border between the successive linear image slices, processing the one or more geometrically shaped regions of interest that are not touching a border between the successive linear image slices.

22. The computer-implemented method according to claim 21, further comprising:
determining whether any of the one or more geometrically shaped regions of interest touch a border between the successive linear image slices; and
in response to determining that a geometrically shaped region of interest touches a border between the successive linear image slices, freezing the geometrically shaped region of interest.

23. The computer-implemented method according to claim 22, further comprising, in response to determining that a geometrically shaped region of interest in a successive linear image slice is adjacent to the geometrically shaped region of interest that was frozen in the previous linear image slice, merging the multiple regions of interest in the two successive linear image slices.

24. The computer-implemented method according to claim 23, further comprising:
determining whether any of the regions of interest overlap; and
if any of the regions of interest overlap, merging the geometrically shaped regions of interest to form a larger geometrically shaped region of interest that include the overlapping geometrically shaped regions of interest.

25. The computer-implemented method according to claim 24, further comprising analyzing each of the geometrically shaped regions of interest to determine which, if any, of the geometrically shaped regions of interest include the code.

* * * * *